(12) United States Patent
Ruan

(10) Patent No.: US 9,697,564 B2
(45) Date of Patent: *Jul. 4, 2017

(54) NORMALIZED IMAGES FOR ITEM LISTINGS

(71) Applicant: eBay Inc., San Jose, CA (US)

(72) Inventor: Angie Ruan, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 14/743,707

(22) Filed: Jun. 18, 2015

(65) Prior Publication Data

US 2015/0287129 A1  Oct. 8, 2015

Related U.S. Application Data

(63) Continuation of application No. 13/526,282, filed on Jun. 18, 2012, now Pat. No. 9,064,184.

(51) Int. Cl.
| | | |
|---|---|---|
| G06K 9/00 | (2006.01) | |
| G06Q 30/06 | (2012.01) | |
| G06K 9/62 | (2006.01) | |
| G09G 5/00 | (2006.01) | |
| G06T 11/60 | (2006.01) | |

(Continued)

(52) U.S. Cl.
CPC ..... *G06Q 30/0643* (2013.01); *G06F 3/04842* (2013.01); *G06F 3/04845* (2013.01); *G06F 3/04847* (2013.01); *G06F 3/147* (2013.01); *G06F 17/3028* (2013.01); *G06K 9/62* (2013.01); *G06T 3/40* (2013.01); *G06T 11/60* (2013.01); *G09G 5/00* (2013.01); *H04N 5/23293* (2013.01); *G06T 2207/10004* (2013.01); *G06T 2207/20221* (2013.01); *G06T 2210/22* (2013.01); *G09G 2340/12* (2013.01)

(58) Field of Classification Search
CPC ............ G06F 17/3028; G06F 3/04842; G06F 3/04845; G06F 3/04847; G06F 3/147; G06K 9/62; G06Q 30/0643; G06T 11/60; G06T 2207/10004; G06T 2207/20221; G06T 2210/22; G06T 3/40; G09G 2340/12; G09G 5/00; H04N 5/23293

See application file for complete search history.

(56) References Cited

U.S. PATENT DOCUMENTS

| | | |
|---|---|---|
| 6,222,538 B1 | 4/2001 | Anderson |
| 6,677,969 B1 | 1/2004 | Hongo |

(Continued)

OTHER PUBLICATIONS

"U.S. Appl. No. 13/693,891, Final Office Action mailed Nov. 19, 2015", 12 pgs.

(Continued)

*Primary Examiner* — Nirav G Patel
(74) *Attorney, Agent, or Firm* — Schwegman, Lundberg & Woessner, P.A.

(57) ABSTRACT

Disclosed in some examples is a method including receiving a selection of an outline template; displaying the outline template in an image preview screen of a digital image capture device; responsive to a capture of an image of the digital image capture device, cropping the image to an outline of the outline template; positioning the cropped image over a second image and sending a combined image formed from the image positioned over the second image to a commerce server, the combined image for use as a product image.

20 Claims, 10 Drawing Sheets

(51) Int. Cl.

| | | |
|---|---|---|
| *G06F 3/147* | (2006.01) | |
| *G06F 3/0484* | (2013.01) | |
| *G06F 17/30* | (2006.01) | |
| *G06T 3/40* | (2006.01) | |
| *H04N 5/232* | (2006.01) | |

(56) References Cited

U.S. PATENT DOCUMENTS

| | | | |
|---|---|---|---|
| 7,924,318 | B2 | 4/2011 | Hasegawa et al. |
| 8,165,401 | B2 | 4/2012 | Funayama et al. |
| 8,289,433 | B2 | 10/2012 | Hara et al. |
| 8,385,607 | B2 | 2/2013 | Okada |
| 8,843,980 | B1 | 9/2014 | Cai et al. |
| 9,064,184 | B2 * | 6/2015 | Ruan ................. G06K 9/62 |
| 2005/0071257 | A1 | 3/2005 | Giannini |
| 2006/0251384 | A1 | 11/2006 | Vronay et al. |
| 2007/0025723 | A1 | 2/2007 | Baudisch et al. |
| 2007/0172151 | A1 | 7/2007 | Gennetten et al. |
| 2007/0274703 | A1 | 11/2007 | Matsuda et al. |
| 2007/0296830 | A1 | 12/2007 | Smith et al. |
| 2008/0030599 | A1 | 2/2008 | Stavely et al. |
| 2008/0055453 | A1 | 3/2008 | Battles et al. |
| 2008/0068487 | A1 | 3/2008 | Morita |
| 2008/0193101 | A1 | 8/2008 | Agnihotri et al. |
| 2008/0313140 | A1 | 12/2008 | Pereira et al. |
| 2009/0086993 | A1 | 4/2009 | Kawaguchi et al. |
| 2009/0280897 | A1 | 11/2009 | Fitzmaurice et al. |
| 2010/0141781 | A1 | 6/2010 | Lu et al. |
| 2010/0177234 | A1 | 7/2010 | Ogura et al. |
| 2010/0217684 | A1 | 8/2010 | Melcher et al. |
| 2010/0245532 | A1 | 9/2010 | Kurtz et al. |
| 2010/0266206 | A1 | 10/2010 | Jo et al. |
| 2010/0293106 | A1 | 11/2010 | Rhoads et al. |
| 2010/0302393 | A1 | 12/2010 | Olsson et al. |
| 2011/0008036 | A1 | 1/2011 | Takatsuka et al. |
| 2011/0148857 | A1 | 6/2011 | Krupka et al. |
| 2011/0222787 | A1 | 9/2011 | Thiemert et al. |
| 2011/0243397 | A1 | 10/2011 | Watkins et al. |
| 2011/0311100 | A1 | 12/2011 | Fan |
| 2012/0002019 | A1 | 1/2012 | Hashimoto et al. |
| 2012/0009555 | A1 | 1/2012 | Hanina et al. |
| 2012/0099000 | A1 | 4/2012 | Kim |
| 2012/0237178 | A1 | 9/2012 | Ishii et al. |
| 2012/0316676 | A1 | 12/2012 | Fouillade et al. |
| 2013/0033615 | A1 | 2/2013 | Ecrement |
| 2013/0038759 | A1 | 2/2013 | Jo et al. |
| 2013/0083215 | A1 | 4/2013 | Wisniewski |
| 2013/0201301 | A1 | 8/2013 | Huang et al. |
| 2013/0234927 | A1 | 9/2013 | Roh |
| 2013/0258117 | A1 | 10/2013 | Penov et al. |
| 2013/0272673 | A1 | 10/2013 | Swearingen et al. |
| 2013/0286238 | A1 | 10/2013 | Tan et al. |
| 2013/0336523 | A1 | 12/2013 | Ruan |
| 2014/0003523 | A1 | 1/2014 | Soroushian et al. |
| 2014/0056479 | A1 | 2/2014 | Bobbitt et al. |
| 2014/0118519 | A1 | 5/2014 | Sahin |
| 2014/0152875 | A1 | 6/2014 | Tobin |
| 2014/0273937 | A1 | 9/2014 | Hyde et al. |
| 2014/0288954 | A1 | 9/2014 | Hanina et al. |
| 2014/0289594 | A1 | 9/2014 | Lampietro et al. |
| 2014/0293220 | A1 | 10/2014 | Kornilov et al. |

OTHER PUBLICATIONS

U.S. Appl. No. 13/693,891, filed Dec. 4, 2012, Guided Video Capture for Item Listings (as amended).

"U.S. Appl. No. 13/526,282, Final Office Action mailed Oct. 1, 2014", 15 pgs.

"U.S. Appl. No. 13/526,282, Non Final Office Action mailed May 13, 2014", 13 pgs.

"U.S. Appl. No. 13/526,282, Notice of Allowance mailed Feb. 20, 2015", 7 pgs.

"U.S. Appl. No. 13/526,282, Response filed Sep. 15, 2014 to Non Final Office Action mailed May 13, 2014", 13 pgs.

"U.S. Appl. No. 13/526,282, Response filed Dec. 2, 2014 to Final Office Action mailed Oct. 1, 2014", 9 pgs.

"U.S. Appl. No. 13/693,891, Final Office Action mailed Dec. 4, 2014", 11 pgs.

"U.S. Appl. No. 13/693,891, Non Final Office Action mailed Mar. 19, 2015", 11 pgs.

"U.S. Appl. No. 13/693,891, Non Final Office Action mailed Mar. 20, 2014", 12 pgs.

"U.S. Appl. No. 13/693,891, Response filed Feb. 26, 2015 to Final Office Action mailed Dec. 4, 2014", 10 pgs.

"U.S. Appl. No. 13/693,891, Response filed Aug. 19, 2015 to Non Final Office Action mailed Mar. 19, 2015", 11 pgs.

"U.S. Appl. No. 13/693,891, Response filed Aug. 20, 2014 to Non Final Office Action mailed Mar. 20, 2014", 14 pgs.

Dementhon, Daniel, et al., "Model-Based Object Pose in 25 Lines of Code", International Journal of Computer Vision, 15, (Jun. 1995), 123-141.

Fitzgibbon, Andrew, et al., "Microsoft Research 3D Video", http://research.microsoft.com/en-us/projects/3dvideo/ last visited Mar. 26, 2013, (Accessed Mar. 26, 2013), 1 pg.

Klypper, "About Klypper", http://klypper.com/aboutKlypper.html last visited Mar. 26, 2013, (Accessed Mar. 26, 2013), 1 pg.

Klypper, "Klypper appstore (1 of 2)", https://itunes.apple.com/us/app/klypper/id507436787?mt=8&ign-mpt=uo%3D4 last visited Mar. 26, 2013, (Accessed Mar. 26, 2013), 3 pgs.

Klypper, "Klypper appstore (2 of 2)", https://itunes.apple.com/us/app/klypper/id507436787?mt=8&ign-mpt=uo%3D4 last visited Mar. 26, 2013, (Accessed Mar. 26, 2013), 2 pgs.

Klypper, "Klypper Home", http://klypper.com/index.html last visited Mar. 26, 2013, (Accessed Mar. 26, 2013), 1 pg.

Klypper, "Klyps the new medium", http://klypper.com/creative-content.html (last visited Mar. 26, 2013), (Accessed Mar. 26, 2013), 2 pgs.

Lowe, David G, et al., "Object recognition from local scale-invariant features", The Proceedings of the Seventh IEEE International Conference on Computer Vision, 1999, vol. 2, (1999), 1150-1157.

* cited by examiner

NORMALIZED IMAGES FOR ITEM LISTINGS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc., All Rights Reserved.

PRIORITY

This application is a continuation of and claims the benefit of priority to U.S. patent application Ser. No. 13/526,282, filed on Jun. 18, 2012, which is hereby incorporated by reference herein in its entirety.

BACKGROUND

Merchants are always attempting to enhance their product presentations to appeal to consumers. These enhancements are aimed at converting consumers viewing these product presentations to purchasing customers. The same is true for online merchants who are attempting to sell various products to consumers over a network commerce system (e.g., an Internet commerce website).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
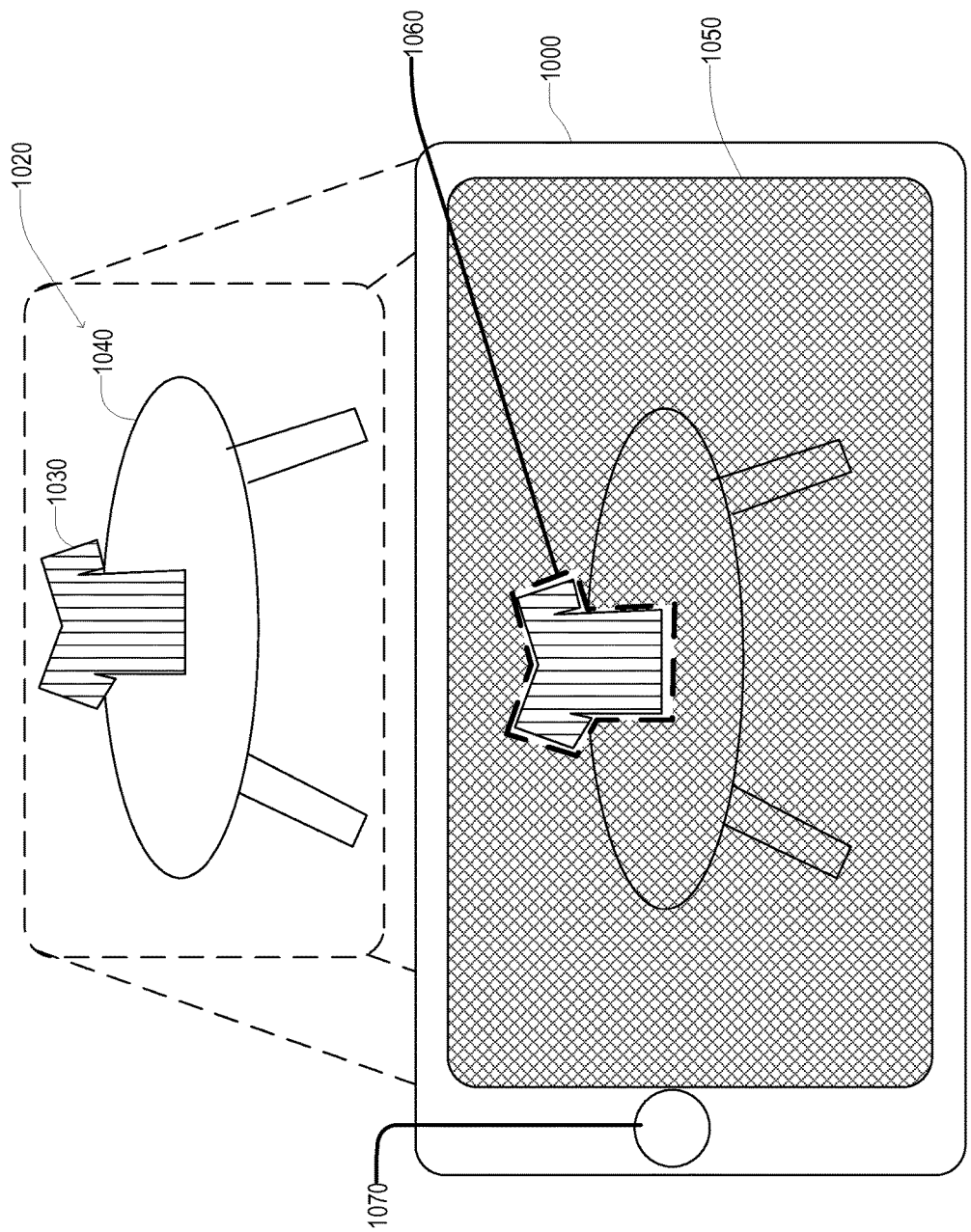
FIG. 1 shows an illustration of an image capture interface using an outline template according to some examples of the present disclosure.

Merchants typically employ various product showcasing techniques to entice consumers to purchase their products. Product showcasing is the act of displaying a product effectively to engage a viewer and entice them to purchase the product. For example, a merchant may showcase an item of clothing by using photographs of models wearing the clothing. As another example, images of home goods such as a lamp or a piece of furniture may be displayed in a living room or other home setting. Showcasing items has several benefits. For instance, with clothing, a photo of a person wearing the item may allow the consumer to see how the item fits when worn. It may also allure consumers if the person photographed with the item of clothing is photogenic as consumers may associate the clothing with the photogenic nature of the model. As a result, images of items showcased in this way may entice more purchases from consumers than if the product is shown by itself. Despite the many benefits of showcasing products in this manner, the time and expense of producing a custom photo shoot for each product is beyond the practical reach for many smaller merchants.

Disclosed in some examples are systems, methods, and machine readable media which may allow merchants the ability to easily showcase their items by digitally creating an image which showcases their items. To accomplish this, the system may allow the merchant to select one of a plurality of outline templates, each outline template corresponding to a particular product. The outline templates visually guide the merchant in taking an image of a particular product with the proper scale, angle, proportions, and rotation. The image may then be cropped to the outline template to create an intermediate product image (which preferably removes any background, leaving the product itself). This intermediate product image may then be superimposed on one of a number of selectable base images (e.g., an image of a model, or a living room scene, or the like) which are associated with the particular selected outline template to create a final product image which showcases the product.

For example, a merchant may showcase a shirt product by first selecting an outline template of a shirt from a variety of outline template choices presented to the merchant. Next, the merchant takes an image of the shirt using the outline template as a guide so the image has the right size, rotation, proportions, and the like. The system may then create an intermediate product image by cropping the image of the shirt such that any background items are removed and the image is only that of the shirt. Next, the merchant may select a base image from a number of available base images which are associated with, or correspond to, the chosen shirt template (e.g., selecting from a number of posed shirt models). The system may then automatically superimpose the intermediate product image on the base image so as to create a final product image which showcases the product. In this example, the final product image is that of a person wearing the product shirt.

In additional examples, the system may be tailored to online marketplaces and may present various dialog boxes which may collect information about the item from the user. From this information and the created photo, the system may build a product listing. A product listing is a description of a product or service which is offered for sale and typically contains information on the product, information on the terms of the sale or auction (or details about the current state of the auction if it is an auction listing), shipping or delivery information, payment information and/or terms, and the like.

The created product listing may then be sent to the online marketplace for automatic placement of the listing on the online marketplace.

Each outline template may correspond to a particular product type, and each product type may have several different outline template choices. Each outline template choice for a particular product type may have different proportions, shape, orientation, or the like. For example, there may be several different shirt templates. Additionally, each outline template may be related to one or more base images. Thus the base images may be matched to the outline template such that an image of product taken while aligned within the outline template may correctly map onto the base image to produce a result that looks similar to that of a professional photo shoot. An outline template is a description of one or more image characteristics (e.g., size, orientation, shape, color, and/or the like) which visually guides the user into taking an image which meets the description of those image characteristics. In one example (shown in FIG. 1), the outline template may be an outline superimposed on the image preview area of the digital camera.

Turning now to FIG. 1, an example application is shown executing on a mobile device 1000. Mobile device 1000 may be any device capable of causing an image to be taken, processing the image, and providing a user interface to a merchant or other user. Mobile device 1000 may include an integrated digital camera, or may interface with an external camera. Example mobile devices 1000 include an iPhone manufactured by Apple, Inc., of Cupertino Calif., a device executing the Android operating system developed by Google, Inc., of Mountain View Calif. (such as the DROID X manufactured by Motorola, Inc., of Schaumberg Ill.), digital cameras, tablets, laptops, or the like. A schematic of an example mobile device is presented in FIG. 9 and will be discussed later. While the present disclosure refers to mobile devices, one skilled in the art with the benefit of Applicant's disclosure will appreciate that other devices may be used. For example, the application may execute on a standard desktop computer system (e.g., with a camera attachment or interface).

In FIG. 1, scene 1020 (comprising the table 1040, and the product—a shirt—1030) is displayed in the image preview area 1050 of the mobile device 1000. The image preview area 1050 shows the user a live preview of what the image would look like if the user were to take the picture at that particular instant. The user (e.g., a merchant) has already selected an image template 1060 which corresponds to a particular product (e.g., a shirt). The image template 1060 may be superimposed onto the displayed preview image and areas outside the template may be shaded. This template indicates to the user the approximate desired size, shape, and orientation which will look best on a particular class of base images. The user may adjust the item 1030, or the camera on the device 1000 (either through the use of zoom or other software functions or through physically moving the camera) so that the item 1030 is within the parameters of the template 1060. The rest of the scene may be shaded or grayed out on the image preview area to clearly indicate that these areas are not going to be part of the image. For example, table 1040 is outside template 1060 in the image, and thus will not appear in the image.

Once the user issues a command to the device 1000 to take the image (e.g., through a button 1070 or through a button on a touch screen display or the like), the device 1000 captures the image as displayed on the image preview area at the time the button was depressed (or shortly thereafter) and stores it to memory. The application running on the device 1000 may then crop the image to the confines of the template 1060, creating an intermediate product image of only the item 1030. The application may then display a series of options for the user to cut, crop, rotate or adjust the image properties.

The application may then present the user with a variety of choices of base images with which to superimpose the intermediate product image upon. These base images may be associated with the selected template. For example, certain base images may relate only to certain templates—thus specific base images may be created for specific products and/or specific product templates. In other examples, certain base images may relate to more than one template. For example, a base image of a living room may be applicable for a variety of types of templates which are for home goods. In yet other examples, users may select any base image regardless of the template chosen. Each base image and template to which it is associated may be matched in size, shape, orientation, or the like so that an image taken using the template will fit over a desired feature of the base image. For example, a base image of a model and a shirt template may be matched so that a picture of a shirt taken with the template fits nicely over the upper body section of the model. In a home scene base image, the home scene and various templates of items in the home scene (e.g., a lamp, curtains, a television, or the like) may be matched such that those items fit well in the home scene. In some examples, multiple intermediate product images may be superimposed onto a particular base image so as to create an entire scene.

Figure 2:
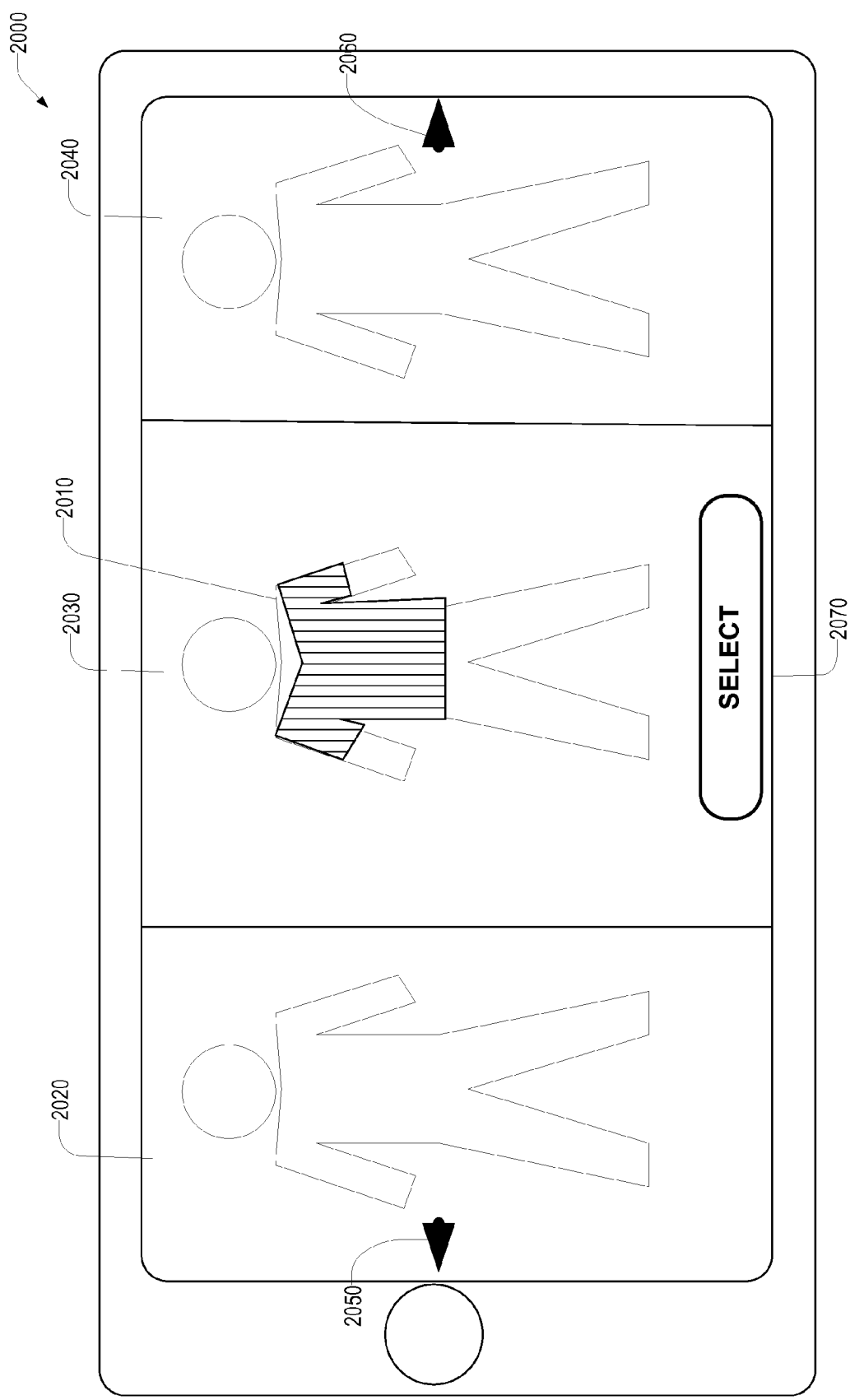
FIG. 2 shows an illustration of a base image selection interface according to some examples of the present disclosure.

FIG. 2 shows an example base image selection screen 2000. The intermediate product image 2010 is superimposed on a first base image 2030, with a previous base image 2020 and next base image 2040 shown on the left and right of the first base image 2030. Other base images may be viewed by using the previous button 2050 or the next button 2060. In some examples, pressing the previous or next buttons 2050 or 2060 may slide the base images 2020-2040 shown left or right, such that the image selection screen presents a carousel of base images with the intermediate product image superimposed over the base image currently in the middle third of the screen. In this way, the user may scroll through a number of options, while previewing how the final product image will look. Once a user is ready to select a particular base image to use as the background, the user may press selection button 2070.

In some examples, each base image may contain information on where the system should place a particular intermediate product image for each template that the base image is associated with. Thus if a base image of a model is associated with a shirt template and a pants template, the base image may have information on where to place intermediate product images taken with the shirt template and information on where to place intermediate product images taken with the pants template. In other examples, the placing of the intermediate product image may be determined by the user. In some examples, even if the system automatically places the intermediate product image on the base image, the user may have the opportunity to adjust the placement of the intermediate product image. For example, adjusting the position, the size, the scale, the tint/tone, or the like to ensure that the intermediate product image looks natural on the base image. In other examples, the application may utilize a number of automatic adjustments so that the image of the product more closely matches the base image.

As already noted, the application may have one or more base images with which the user may superimpose the intermediate product image. These base images may be preloaded into the software, may be downloaded from any number of network locations (e.g., network based servers), or may be previously taken by the user. In some examples, service providers may setup image servers which may provide base images to users executing the application. In some examples, the service providers may charge a small fee for these images. In this way, the cost of these base images (e.g., the cost of a model shoot) may be dispersed among a number of network based commerce merchants.

In the examples described so far, the template was chosen first which then determined the selection of base images that the merchant may select. In other examples, the base images may be selected first, which may then determine the set of outline templates available to the user. For example, the merchant may pick a particular model based upon looks, ethnicity, gender, size, shape, or the like and then the particular outline templates available may be shown for selection.

In some examples, the application may further include features which allow a network based merchant to not only create a final product image which showcases their product, but also may include features to guide the merchant through creating a network based product listing for their product according to a defined template. For example, the application may be setup to determine a product title, description, price (including in some examples prices relevant to an online auction such as a minimum bid price, a reserve price, a buy-it-now price which allows a bidder to circumvent the auction and buy the item, or the like), shipping details, tax details, or the like. This information may then be formatted according to a listing template. The listing template may be supplied with the application, may be downloaded from a network service across a network, or the like.

The final product image may be combined with the information submitted by the merchant regarding the product to form an item listing. The item listing may be shown to the user for a preview. If the user is not satisfied with the item listing, the user may make changes to it. Once the user is satisfied with the listing, the application may automatically contact a network service to submit the listing such that the listing shows up in the internet merchant's commerce site (or a third parties commerce site). In some examples, the application may need to authenticate with the network commerce service, and may require the merchant to enter a number of authentication details (e.g., a username/password).

Figure 3:
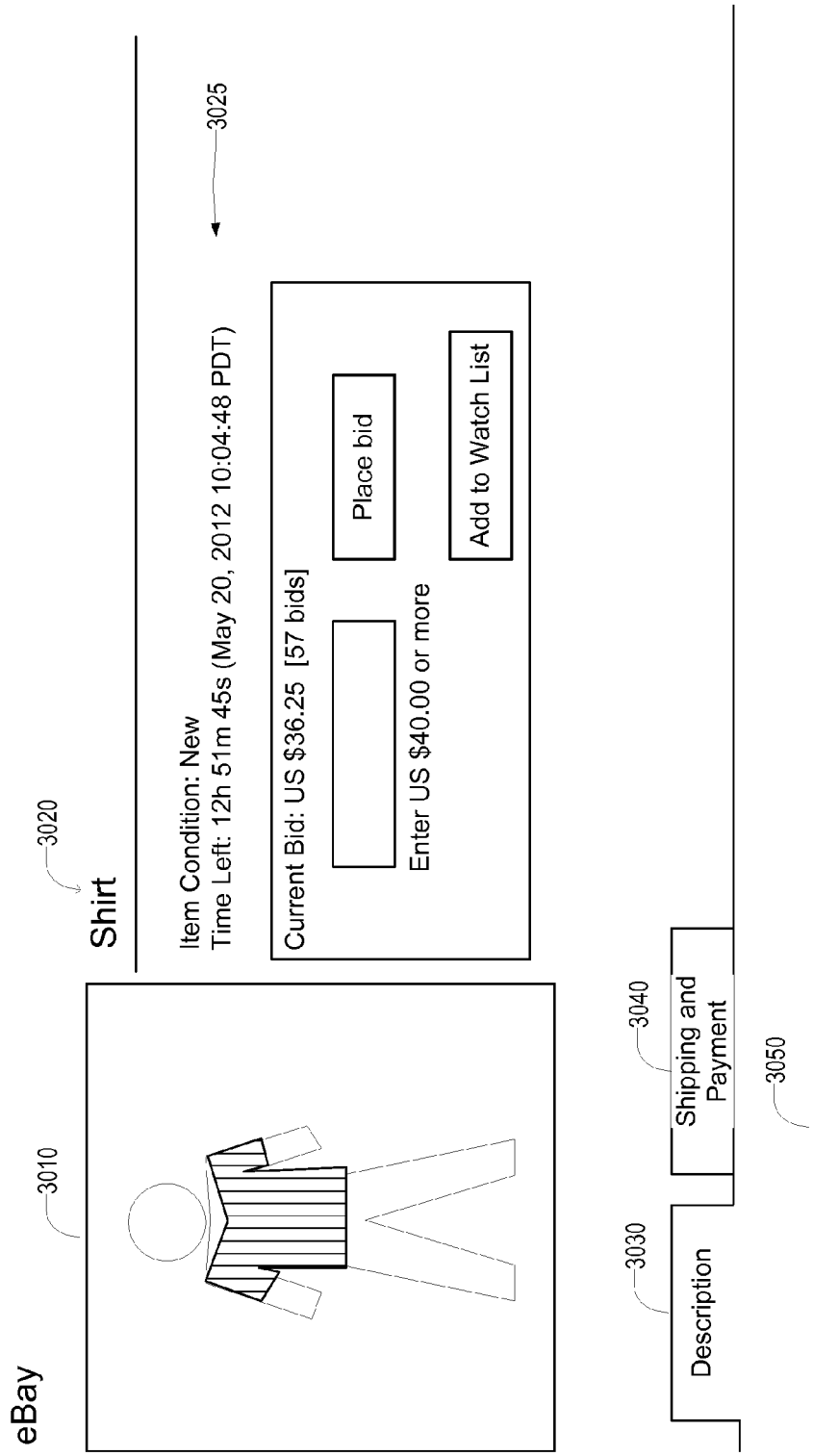
FIG. 3 shows an illustration of a product listing according to some examples of the present disclosure.

For example, FIG. 3 shows an example listing for an online auction marketplace (e.g., eBay.com). The application may create such a listing and communicate it with eBay's servers to have it automatically listed on the online commerce website. The listing may show a product image 3010 (such as a final product image which showcases the product), a title 3020, a short item description 3025 (e.g., the item condition, the time left in the auction, and bid details). In addition, a detailed description 3050 (accessible to a buyer by selecting a description tab 3030), shipping and payment information (not shown in FIG. 3, but accessible by a user by selecting the shipping and payment info tab 3040) and other information may be presented. Note that in some examples, information displayed in the listing as it exists on the network commerce system may be inserted into the listing and/or updated by processes on the network commerce system in response to events handled by the network commerce system (e.g., number of bids, current bid, time left in the auction, availability of the product, and the like).

Figure 4:
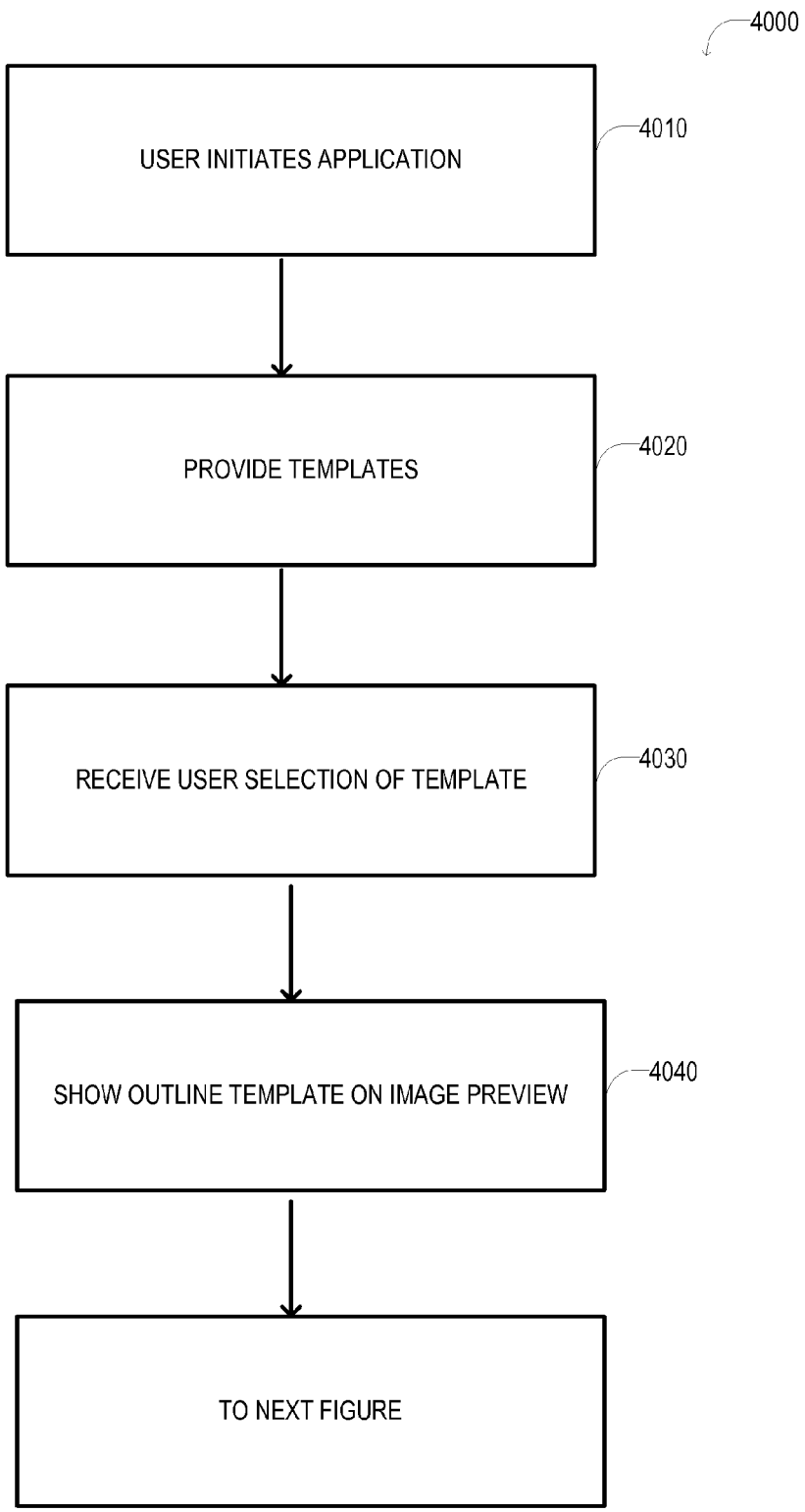
FIG. 4 shows a flowchart of a method of creating a final product image according to some examples of the present disclosure.

FIG. 4 shows an example method of the present disclosure, according to an embodiment. At 4010 the user initiates the application. In some examples, the application may be a standalone application which contains image capture instructions (e.g., interfaces with the camera on the device), in other examples, it may integrate with the camera application on the device already. At operation 4020, the application may allow the user to choose which outline template to use from the one or more outline templates that are available. As already noted, the application may download these from a network server, or allow the user to submit their own. At operation 4030, the application may receive the user's outline template selection. At operation 4040, the application may display a scene on the preview area which shows the user the image produced by the image sensor in real time and indicates how the image may look if the user took the picture at that instant in time. In some examples, the application may superimpose the outline template on the image displayed in the preview area, and may grey out areas of the preview image which do not fit within the template.

Figure 5:
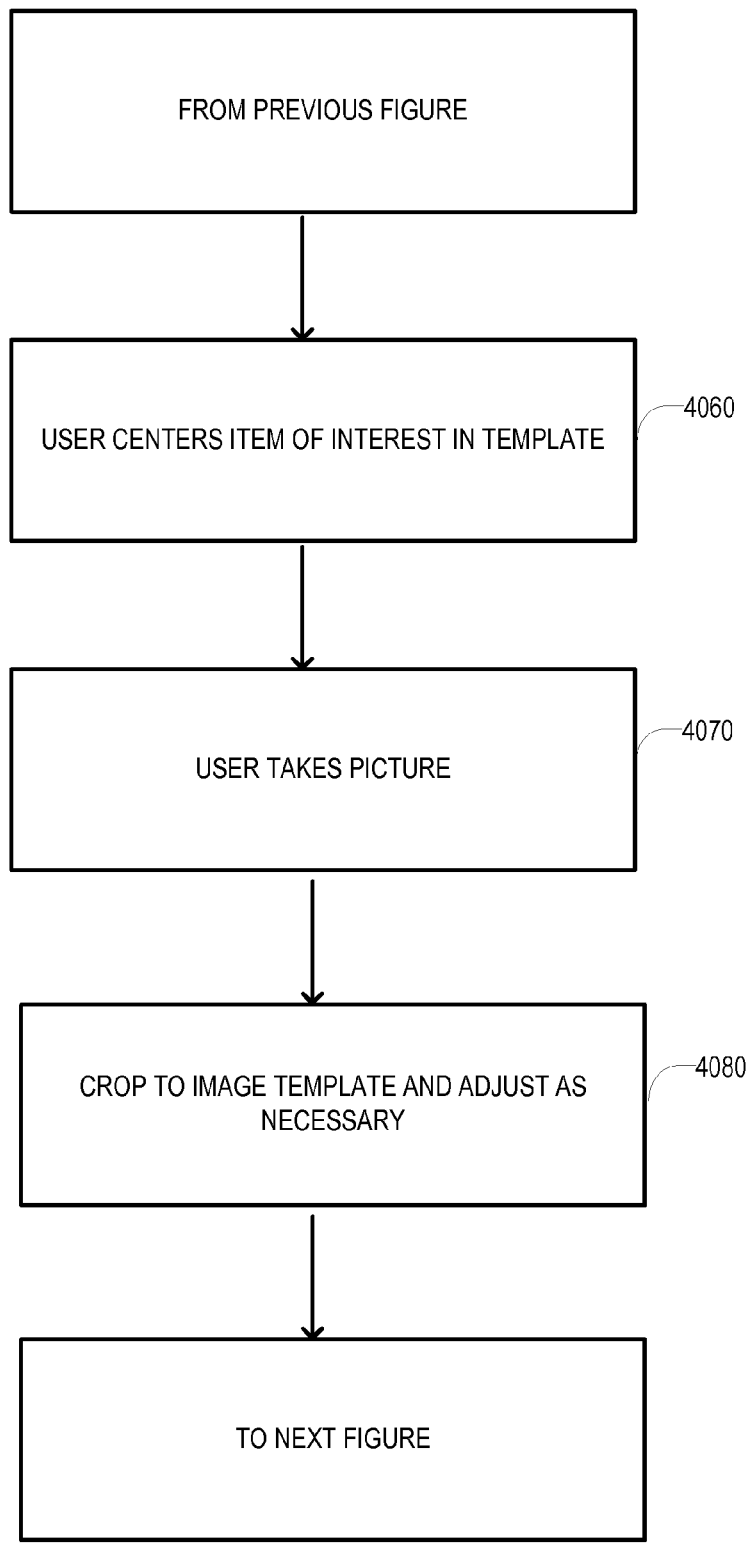
FIG. 5 shows a flowchart of a method of creating a final product image according to some examples of the present disclosure.

Continuing on with FIG. 5, the user preferably may center the item of interest within the template by adjusting the camera physically, zooming in/out, or by taking other image adjustment steps so that the product is centered and placed within the template (as determined by the image preview) at operation 4060. At operation 4070 the user takes the picture. At operation 4080 the application may crop the image to the template to create the intermediate product image. In some examples, the application may allow the user to adjust the intermediate product image as necessary.

Figure 6:
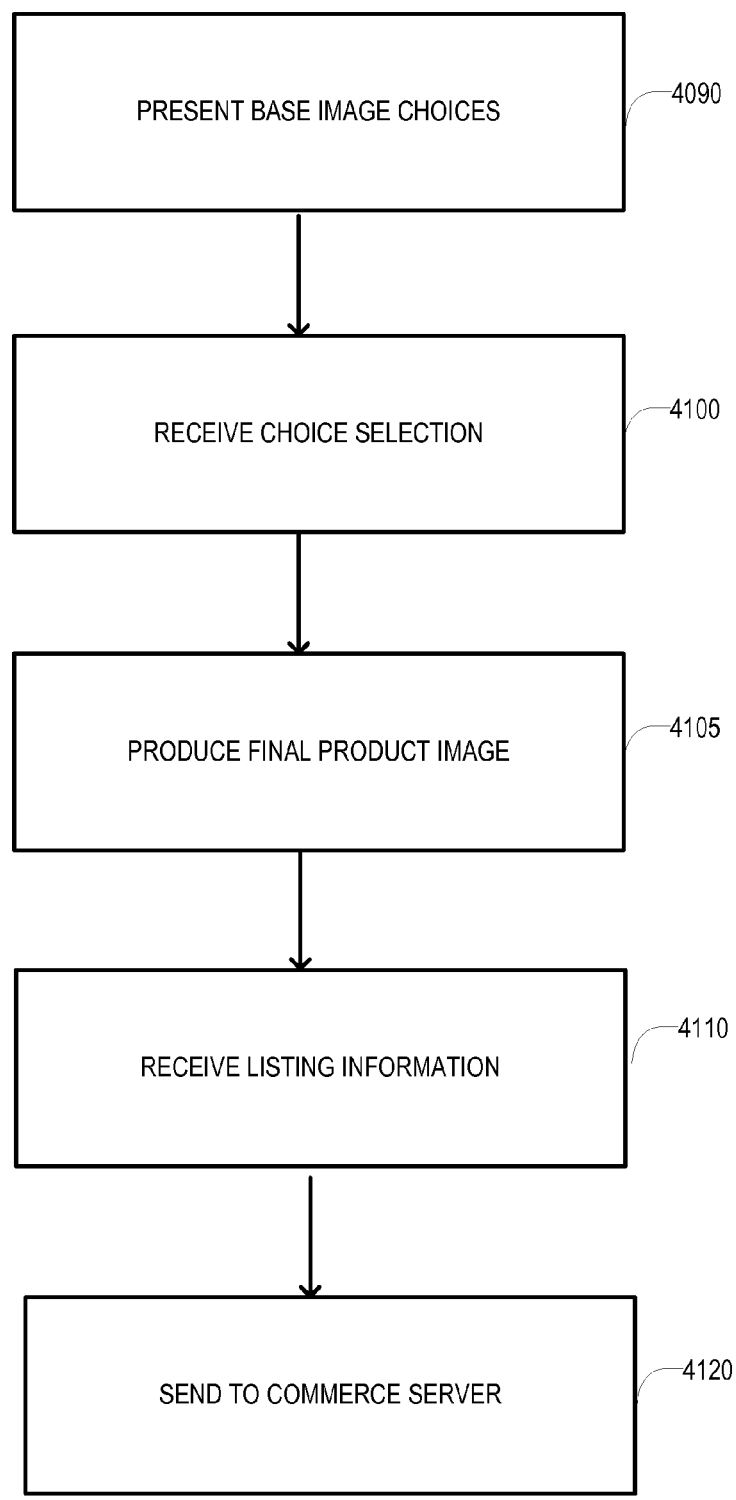
FIG. 6 shows a flowchart of a method of creating a final product image according to some examples of the present disclosure.

Continuing on to FIG. 6, the application may present base image choices 4090 which the intermediate product image is to be superimposed upon. Once the user makes the selection and indicates the selection to the application at operation 4100, the application may create the product image. At operation 4105, the system may superimpose the intermediate product image onto the selected base image using placement instructions in the base image or based upon additional user input to generate the final product image.

At operation 4110, the user may provide listing information to the application which may allow the application to build a listing. At operation 4120 the listing information, along with the final product image, may be sent to a commerce server for listing.

Figure 7:
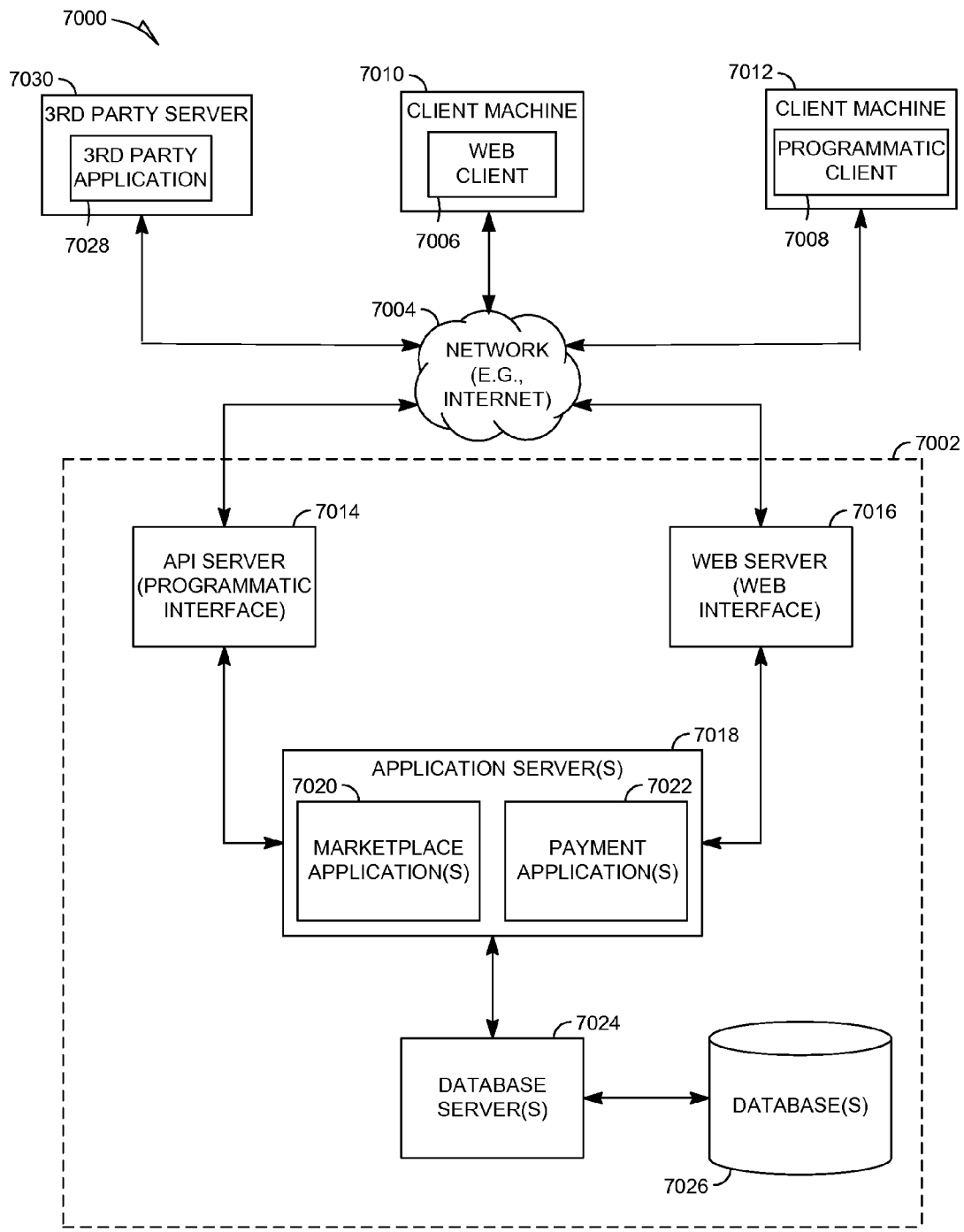
FIG. 7 shows a schematic of a network commerce system according to some examples of the present disclosure.

FIG. 7 is a network diagram depicting a client-server system 7000, within which example embodiments may be deployed. A networked system 7002, in the example forms of a network-based marketplace or publication system, provides server-side functionality, via a network 7004 (e.g., the Internet or Wide Area Network (WAN)) to one or more clients. FIG. 7 illustrates, for example, a web client 7006 (e.g., a browser, such as the Internet Explorer browser developed by Microsoft Corporation of Redmond, Wash. State), and a programmatic client 7008 executing on respective client machines 7010 and 7012.

An Application Program Interface (API) server 7014 and a web server 7016 are coupled to, and provide programmatic and web interfaces respectively to, one or more application servers 7018. The application servers 7018 host one or more marketplace applications 7020 and payment applications 7022. The application servers 7018 are, in turn, shown to be coupled to one or more databases servers 7024 that facilitate access to one or more databases 7026.

The marketplace applications 7020 may provide a number of marketplace functions and services to users that access the networked system 7002. For example, marketplace applications 7020 may provide one or more background images. The payment applications 7022 may likewise provide a number of payment services and functions to users.

The payment applications 7022 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 7020. While the marketplace and payment applications 7020 and 7022 are shown in FIG. 7 to both form part of the networked system 7002, it will be appreciated that, in alternative embodiments, the payment applications 7022 may form part of a payment service that is separate and distinct from the networked system 7002.

Further, while the system 7000 shown in FIG. 7 employs a client-server architecture, the present invention is of course not limited to such an architecture, and could equally well find application in a distributed, or peer-to-peer, architecture system, for example. The various marketplace and payment applications 7020 and 7022 could also be implemented as standalone software programs, which do not necessarily have networking capabilities.

The web client 7006 accesses the various marketplace and payment applications 7020 and 7022 via the web interface supported by the web server 7016. Similarly, the programmatic client 7008 accesses the various services and functions provided by the marketplace and payment applications 7020 and 7022 via the programmatic interface provided by the API server 7014. The programmatic client 7008 may, for example, be a seller application (e.g., the TurboLister application developed by eBay Inc., of San Jose, Calif.) to enable sellers to author and manage listings on the networked system 7002 in an off-line manner, and to perform batch-mode communications between the programmatic client 7008 and the networked system 7002. In some examples, the programmatic client 7008 may be a seller application operating on a mobile device, such as a mobile device described in FIG. 9. In some examples, the programmatic client 7008 may execute a client application, such as that described in FIG. 8 and which may provide functionality as described in FIGS. 1-6. In other examples, the client machine 7010, 7012 may be buyer machines which access the networked system 7002 to buy products.

FIG. 7 also illustrates a third party application 7028, executing on a third party server machine 7030, as having programmatic access to the networked system 7002 via the programmatic interface provided by the API server 7014. For example, the third party application 7028 may, utilizing information retrieved from the networked system 7002, support one or more features or functions on a website hosted by the third party. The third party website may, for example, provide one or more promotional, marketplace or payment functions that are supported by the relevant applications of the networked system 7002. In other examples, the third party server machine 7030 may provide one or more base images and/or outline templates used in examples described herein.

Figure 8:
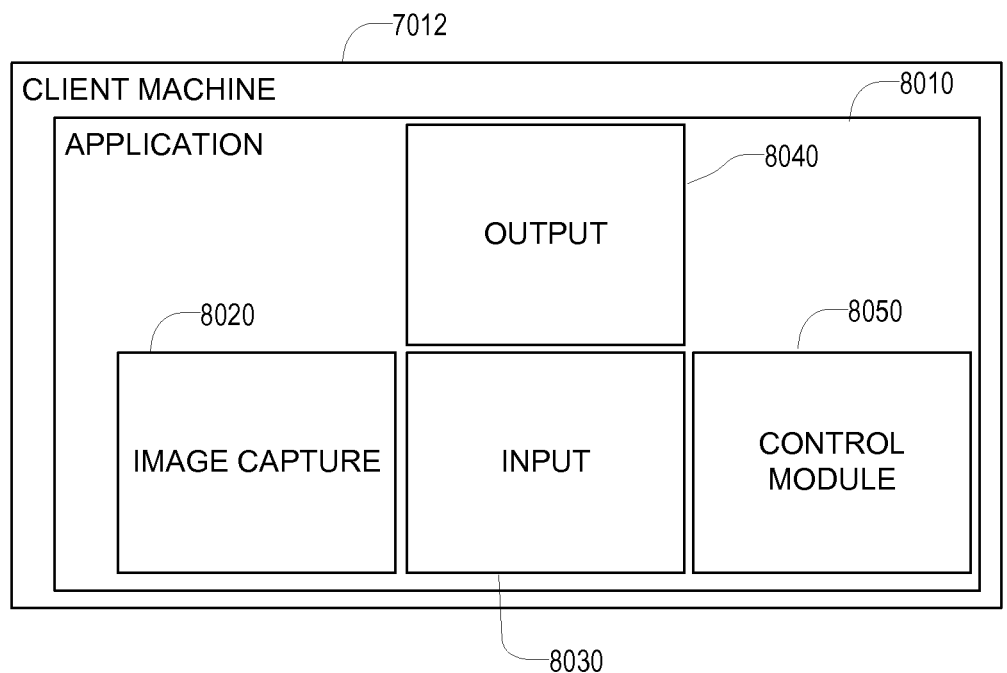
FIG. 8 shows a schematic of a client machine according to some examples of the present disclosure.

FIG. 8 denotes an example application 8010 executing on a client machine (e.g., 7012 from FIG. 7). In some examples, application 8010 may have an image capture module 8020 which may utilize a digital camera to take one or more digital images or video. The image capture module 8020 may control the digital camera and cause a preview image to be displayed on a display device of client machine 7012 or a display device connected externally to client machine 7012 through output module 8040. For example, the image capture module 8020 may periodically sample the digital camera for the image data currently seen by the image sensor. The image data may then be processed and sent to the output module for display as an image preview. In some examples the image data may be processed to add the outline template to create the effects shown in FIG. 1. When instructed, the image capture module 8020 may also capture an image and transfer it to a memory device and/or control module 8050 for processing.

Input module 8030 may collect input from the user, for example, input module may receive and process the user selection of the outline template, receive and process the user selection of the base image, receive information about the product and the like. Input module 8030 may also receive input over a network interface from one or more network servers. For example, messages from a network commerce server (such as a network system 7002) relating to the submission of product listings or the download of images (e.g., base images), templates, or the like. Input module 8030 may collect input through one or more physical input devices (e.g., keyboards, keypads, pointing devices, or the like), or virtual keys on a touch screen display as well as through a network interface (e.g., through Ethernet, Wi-Fi, or other connection).

Output module 8040 may cause various images to be displayed on a display of the client machine 7012. For example, output module may cause to be displayed a template selection screen, a preview image (with the template superimposed), a base image selection screen, a listing details input screen, a listing preview screen, various menus, the image preview screen, and other screens. For example, output module may cause to be displayed the graphical user interfaces described in FIGS. 1-3 or similar. Output module 8040 may also send output over a network interface to one or more network servers. For example, output module 8040 may communicate with a network commerce server (such as a network system 7002) to submit product listings, download images (e.g., base images), templates, or the like.

Control module 8050 may coordinate amongst the image capture module 8020, the input module 8030, and the output module 8040 to provide the application to the user. For example, the control module 8050 may signal the output module 8040 to display the list of templates (or an image representation of the templates) to the user and receive the selection from the input module 8030. The chosen template may then be communicated by the control module 8050 to the image capture module 8020 along with instructions to conduct an image capture. The image capture module 8020 may utilize the template when displaying the image preview. The input module 8030 may signal the control module 8050 when the user presses a button to take the picture. The control module 8050 may then signal the image capture module 8020 to record the image currently detected by the image detector (e.g., a Charged Coupled Detector or CCD or the like). The image may then be transferred to the control module 8050 where the control module 8050 may then crop the image based upon the outline template to create an intermediate product image.

The control module 8050 may then direct the output module 8040 to display the intermediate product image along with a number of image manipulation controls. The input module 8040 may signal the control module 8050 upon the selection of an image manipulation control. The control module 8050 may update the output module 8040 to reflect the selection of the control and may receive more inputs regarding operations done with the image manipulation controls and may manipulate the intermediate product image in accordance with those controls. Once the user is happy with the image, the input module 8030 may receive a "next" indication or some other indication that the user is happy with the image.

Upon receiving this indication the control module 8050 may direct the output module 8040 to display a series of base images and receive the selection of the user's chosen base image from the input module 8030. Upon receiving the selection, the control module 8050 may superimpose the intermediate product image onto the chosen base image based upon positioning information in the chosen outline template to create a final product image. In some examples, the control module 8050 may again present an image editing interface (through output and input modules) and may allow for editing the final product image. Once the image is finalized, the control module 8050 may direct the output module 8040 to display a series of item information input fields according to a listing template which may define the information which the user may desire to have in their listing. The input module 8030 may send the user's inputs regarding the information to the control module 8050. The control module 8050 may then build the listing and submit it for presentation to buyers according to an Application Programming Interface of the networked system 7002.

One skilled in the art with the benefit of Applicants' disclosure will appreciate that although the examples described herein utilized an application executing on a particular client machine 7012, the functionality described may be distributed across a plurality of machines which may be connected by a network. For example, some of the functionality may be performed by a network server (e.g., a server in the networked system 7002).

Figure 9:
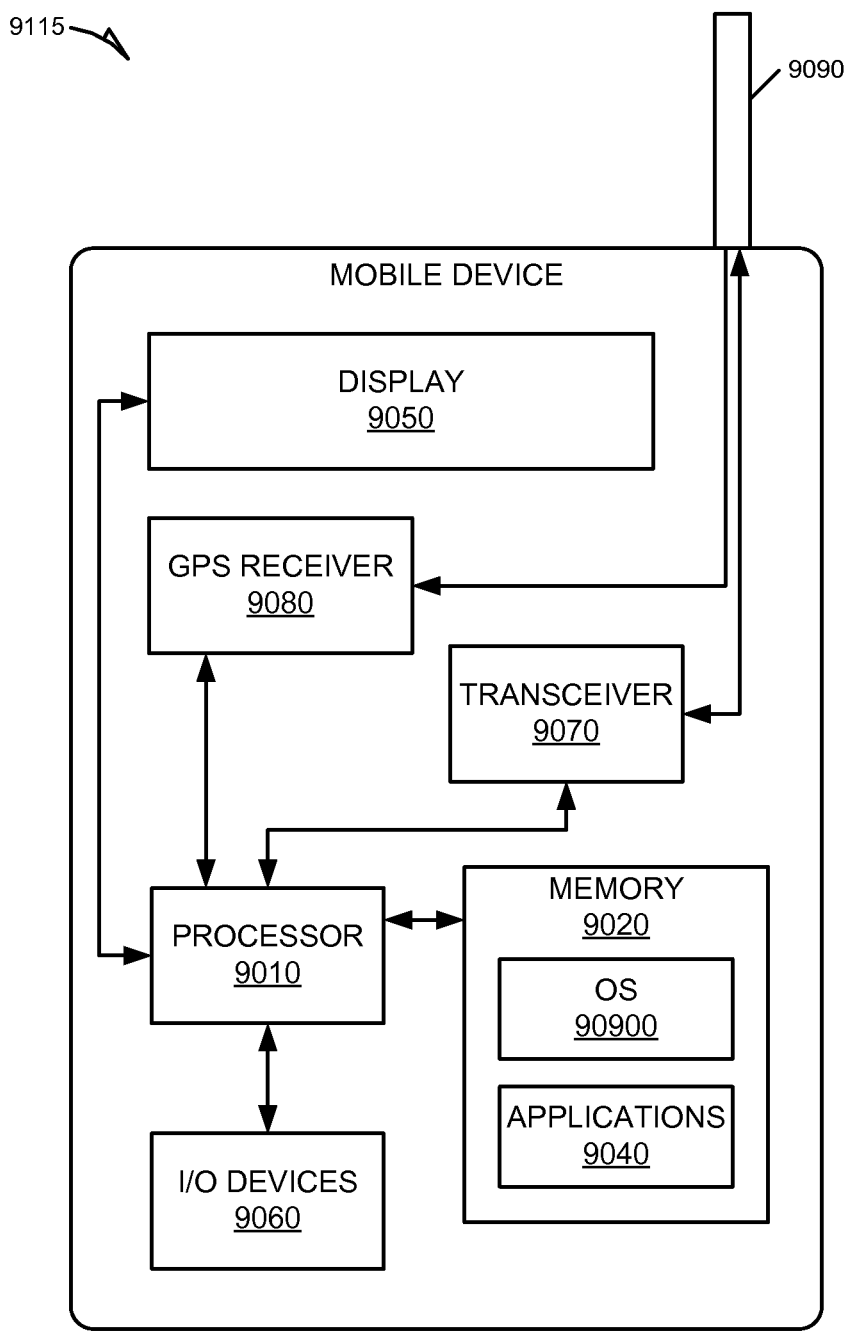
FIG. 9 shows a schematic of a mobile device according to some examples of the present disclosure.

FIG. 9 is a block diagram illustrating a mobile device 9115, according to an example embodiment upon which various embodiments may execute. The mobile device 9115 may include a processor 9010. The processor 9010 may be any of a variety of different types of commercially available processors suitable for mobile devices (for example, an XScale architecture microprocessor, a Microprocessor without Interlocked Pipeline Stages (MIPS) architecture processor, a processor operating according to a Reduced Instruction Set (RISC) such as a PowerPC processor, a processor operating according to a Complex Instruction Set (CISC) such as an Intel x086 processor, or another type of processor). A memory 9020, such as a Random Access Memory (RAM), a Flash memory, or other type of memory, may be communicatively coupled to the processor (e.g., through a bus or other communication pipeline). The memory 9020 may be adapted to store an operating system (OS) 9030, as well as application programs 9040, such as an application which allows users to create final product images according to the present disclosure. Example OS' include the Android OS developed by Google Inc., of Mountain View Calif., iOS developed by Apple of Cupertino, Calif., Windows Mobile developed by Microsoft Corp., of Redmond Wash., or the like. The processor 9010 may be coupled, either directly or via appropriate intermediary hardware, to a display 9050 and to one or more input/output (I/O) devices 9060, such as a keypad, a touch panel sensor, a microphone, and the like. For example, the mobile device 9115 may include multi-touch-screen displays which support input entry through multi-touch gestures. Example multi-touch screen displays include capacitive touch screen displays, resistive touch screen displays, or the like. Similarly, in some embodiments, the processor 9010 may be coupled to a transceiver 9070 that interfaces with an antenna 9090. The transceiver 9070 may be configured to both transmit and receive cellular network signals, wireless data signals, or other types of signals via the antenna 9090, depending on the nature of the mobile device 9115. In this manner, a connection with a communication network may be established. For example, the transceiver may operate in accordance with a $2^{nd}$ Generation wireless network (e.g., a Global System for Mobile Communications GSM network, a General Packet Radio Service GPRS network), a $3^{rd}$ Generation wireless network (e.g., a Universal Mobile Telecommunications Network UMTS), a $4^{th}$ Generation wireless network (e.g., Long Term Evolution LTE, Long Term Evolution-Advanced LTE-A), a network according to an Institute for Electrical and Electronics Engineers IEEE 802.11 family of standards (such as 802.11n) or the like. Further, in some configurations, a Global Positioning System receiver 9080 may also make use of the antenna 9090 to receive GPS signals.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
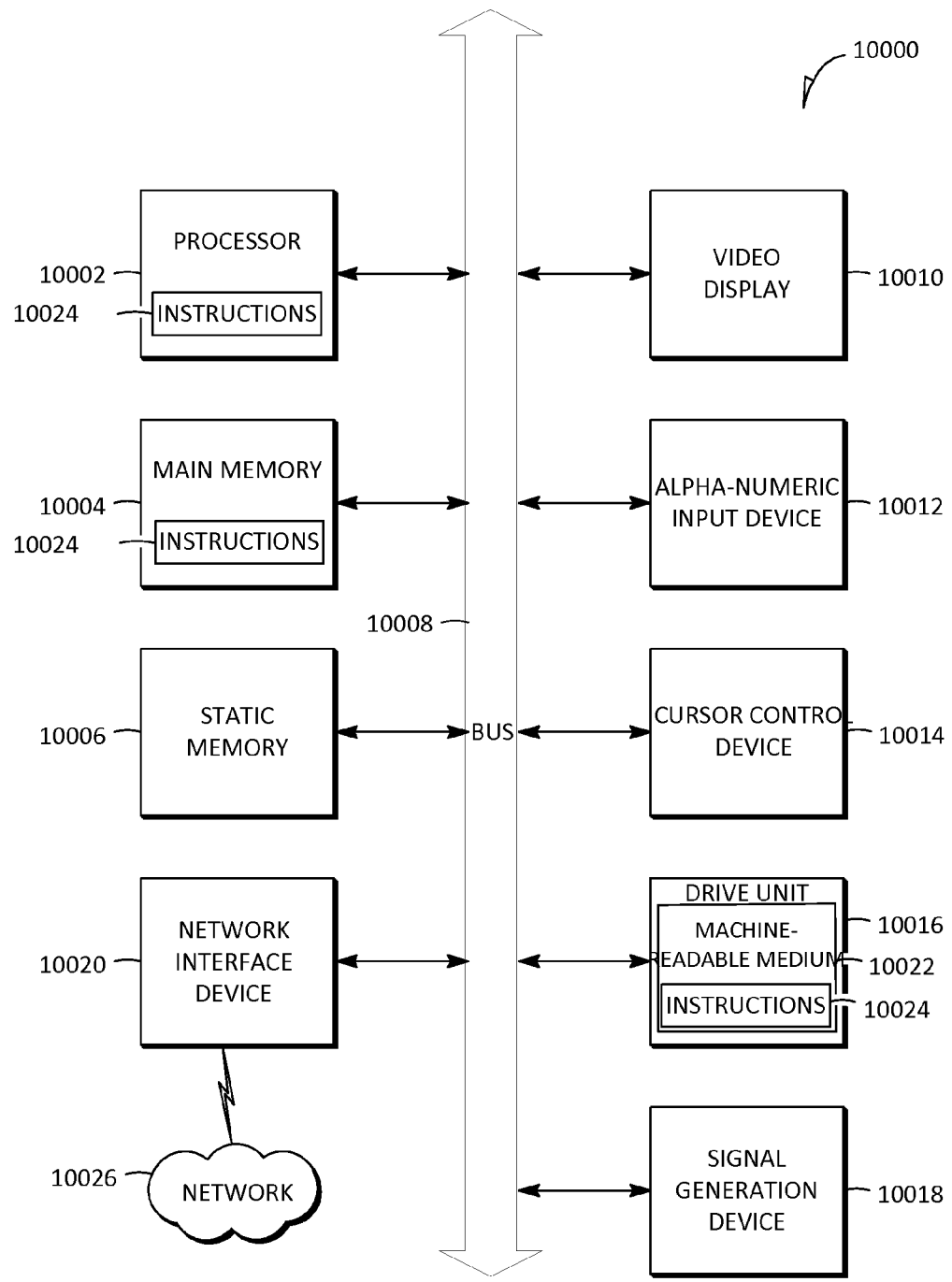
FIG. 10 shows a schematic of a machine according to some examples of the present disclosure.

FIG. 10 is a block diagram of machine in the example form of a computer system 10000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 10000 includes a processor 10002 (e.g., a central processing unit (CPU), a graphics processing unit (GPU) or both), a main memory 10004 and a static memory 10006, which communicate with each other via a bus 10008. The computer system 10000 may further include a video display unit 10010 (e.g., a liquid crystal display (LCD) or a cathode ray tube (CRT)). The computer system 10000 also includes an alphanumeric input device 10012 (e.g., a keyboard), a user interface (UI) navigation device 10014 (e.g., a mouse), a disk drive unit 10016, a signal generation device 10018 (e.g., a speaker) and a network interface device 10020.

Machine-Readable Medium

The disk drive unit 10016 includes a machine-readable medium 10022 on which is stored one or more sets of instructions and data structures (e.g., software) 10024 embodying or used by any one or more of the methodologies or functions described herein. The instructions 10024 may also reside, completely or at least partially, within the main memory 10004, static memory 10006, and/or within the processor 10002 during execution thereof by the computer system 10000, the main memory 10004 and the processor 10002 also constituting machine-readable media.

While the machine-readable medium 10022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 10024 may further be transmitted or received over a communications network 10026 using a transmission medium. The instructions 10024 may be transmitted using the network interface device 10020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

OTHER NOTES AND EXAMPLES

Example 1

A method comprising receiving a selection of an outline template; displaying the outline template in an image preview screen of a digital image capture device; responsive to receiving a capture of an image from the digital image capture device, cropping the image to an outline of the outline template; positioning the cropped image over a second image; creating a combined image formed from the cropped image positioned over the second image using a computer processor; and sending the combined image to a commerce server over a network as part of an item listing.

Example 2

The method of example 1, wherein the second image is selected from a plurality of second images which are associated with the outline template.

Example 3

The method of example 2, wherein each particular image of the plurality of second images associated with the outline template contains positioning information, and wherein the positioning the cropped image over the second image comprises using the positioning information to position the cropped image onto the particular image.

Example 4

The method of any one of examples 1-3, wherein the digital image capture device is part of a mobile computing device.

Example 5

The method of example 4, wherein the mobile computing device includes a radio transceiver for sending and receiving data.

Example 6

The method of any one of examples 1-5, further including: receiving an item description; and sending the item description along with the combined image to the commerce server, the combined image and the item description forming the item listing.

Example 7

The method of any one of examples 1-6, wherein the outline template is selected from a plurality of outline templates presented on the image preview screen.

Example 8

A system including an input module, configured to: receive a capture of an image from a digital image capture device; receive a selection of an outline template; and receive a selection of a second image; an output module, configured to: display the outline template in an image preview screen of the digital image capture device; a control module, configured to: crop the image to an outline of the outline template responsive to receiving the capture of the image from the digital image capture device; position the cropped image over the second image; create a combined image formed from the cropped image positioned over the second image; and an output module, configured to: send the combined image to a commerce server over a network as part of an item listing.

Example 9

The system of example 8, wherein the second image is selected from a plurality of second images which are associated with the outline template.

Example 10

The system of example 9, wherein each particular image of the plurality of second images associated with the outline template contains positioning information, and wherein the control module is configured to position the cropped image over the second image by at least using the positioning information to position the cropped image onto the particular image.

Example 11

The system of any one of examples 8-10, wherein the digital image capture device is part of a mobile computing device.

Example 12

The system of example 11, wherein the mobile computing device includes a radio transceiver for sending and receiving data.

Example 13

The system of any one of examples 8-12, wherein the input module is further configured to receive an item description and the output module is further configured to send the item description along with the combined image to the commerce server, the combined image and the item description forming the item listing.

Example 14

The system of any one of examples 8-13, wherein the outline template is selected from a plurality of outline templates presented on the image preview screen.

Example 15

A machine readable medium that stores instructions which when performed by a machine, cause the machine to perform operations comprising: receiving a selection of an outline template; display the outline template in an image preview screen of a digital image capture device; responsive to receiving a capture of an image from the digital image capture device, cropping the image to an outline of the outline template; position the cropped image over a second image; create a combined image formed from the cropped image positioned over the second image; and send the combined image to a commerce server over a network as part of an item listing.

Example 16

The machine readable medium of example 15, wherein the second image is selected from a plurality of second images which are associated with the outline template.

Example 17

The machine readable medium of example 16, wherein each particular image of the plurality of second images associated with the outline template contains positioning information, and wherein the positioning the cropped image over the second image comprises using the positioning information to position the cropped image onto the particular image.

Example 18

The machine readable medium of any one of examples 15-17, wherein the digital image capture device is part of a mobile computing device.

Example 19

The machine readable medium of example 18, wherein the mobile computing device includes a radio transceiver for sending and receiving data.

Example 20

The machine readable medium of any one of examples 15-19, wherein the instructions further comprise instructions which when performed by the machine cause the machine to: receive an item description; and send the item description along with the combined image to the commerce server, the combined image and the item description forming the item listing.

Example 21

The machine readable medium of any one of examples 15-20, wherein the outline template is selected from a plurality of outline templates presented on the image preview screen.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:
using one or more computer processors:
receiving a selection of an outline template;
responsive to receiving a capture of an image from a digital image capture device, cropping the image to generate a cropped image corresponding to the outline template;
positioning the cropped image over a second image using positioning information corresponding to the second image to position the cropped image onto the second image, the second image being a different image than the outline template and related to the outline template; and
creating a combined image formed from the cropped image composited with the second image.

2. The method of claim 1, wherein the second image is selected from a plurality of images corresponding to the outline template.

3. The method of claim 2, comprising:
receiving information about a product that is for sale;
creating an item listing comprising the information about the product and the combined image; and
uploading the item listing to a network-based commerce system.

4. The method of claim 3, comprising:
displaying the outline template in an image preview screen of a digital image capture device.

5. The method of claim 4, comprising:
providing an interface to a user to allow the user to adjust one or more of: the position of the cropped image on the second image, adjust a size of the cropped image, adjust a tint of the cropped image, or adjust a tone of the cropped image.

6. The method of claim 1, wherein the positioning information is predetermined and specifies a location of the cropped image with respect to the second image.

7. The method of claim 6, further comprising: providing an interface to a user to allow the user to adjust one or more of: the position of the cropped image on the second image, adjust a size of the cropped image, adjust a tint of the cropped image, or adjust a tone of the cropped image.

8. A mobile computing device, comprising:
a digital image capture device;
one or more computer processors, communicatively coupled to the digital image capture device, and wherein the one or more computer processors are configured to:
receive a selection of an outline template;
receive a capture of an image from the digital image capture device;
crop the image to generate a cropped image corresponding to the outline template;
position the cropped image over a second image using positioning information corresponding to the second image to position the cropped image onto the second image, the second image being a different image than the outline template and related to the outline template; and
create a combined image formed from the cropped image composited with the second image.

9. The mobile computing device of claim 8, wherein the second image is selected from a plurality of images corresponding to the outline template.

10. The mobile computing device of claim 9, wherein the input module is configured to:
receive information about a product that is for sale; and
wherein the control module is configured to:
create an item listing comprising the information about the product and the combined image; and
cause the item listing to be uploaded to a network-based commerce system.

11. The mobile computing device of claim 10, comprising:
an output module configured to display the outline template in an image preview screen of the digital image capture device.

12. The mobile computing device of claim 11, wherein the output module is configured to provide an interface to a user to allow the user to adjust one or more of: the position of the cropped image on the second image, adjust a size of the cropped image, adjust a tint of the cropped image, or adjust a tone of the cropped image.

13. The mobile computing device of claim 8, wherein the positioning information is predetermined and specifies a location of the cropped image with respect to the second image.

14. The mobile computing device of claim 13, further comprising an output module configured to provide an interface to a user to allow the user to adjust one or more of: the position of the cropped image on the second image, adjust a size of the cropped image, adjust a tint of the cropped image, or adjust a tone of the cropped image.

15. A non-transitory machine-readable medium, comprising instructions, which when performed by a machine, causes the machine to perform operations comprising:
receiving a selection of an outline template;
responsive to receiving a capture of an image from a digital image capture device, cropping the image to generate a cropped image corresponding to the outline template;
positioning the cropped image over a second image using positioning information corresponding to the second image to position the cropped image onto the second image, the second image being a different image than the outline template and related to the outline template; and creating a combined image formed from the cropped image composited with the second image.

16. The non-transitory machine readable medium of claim 15, wherein the outline template is selected from a plurality of available outline templates corresponding to a particular type of product.

17. The non-transitory machine readable medium of claim 16, wherein the operations comprise:

receiving information about a product that is for sale, the product that is for sale being the particular type of product;

creating an item listing comprising the information about the product and the combined image; and uploading the item listing to a network-based commerce system.

18. The non-transitory machine readable medium of claim 17, wherein the operations comprise:

displaying the outline template in an image preview screen of a digital image capture device.

19. The non-transitory machine readable medium of claim 18, wherein the operations comprise:

providing an interface to a user to allow the user to adjust one or more of: the position of the cropped image on the second image, adjust a size of the cropped image, adjust a tint of the cropped image, or adjust a tone of the cropped image.

20. The non-transitory machine readable medium of claim 15, wherein the positioning information is predetermined and specifies a location of the cropped image with respect to the second image.

* * * * *